Jan. 13, 1942.   C. R. RANEY ET AL   2,269,987
AGRICULTURAL IMPLEMENT
Filed Oct. 9, 1940   3 Sheets-Sheet 1

Inventors
Clemma R. Raney
Frederick E. Hand

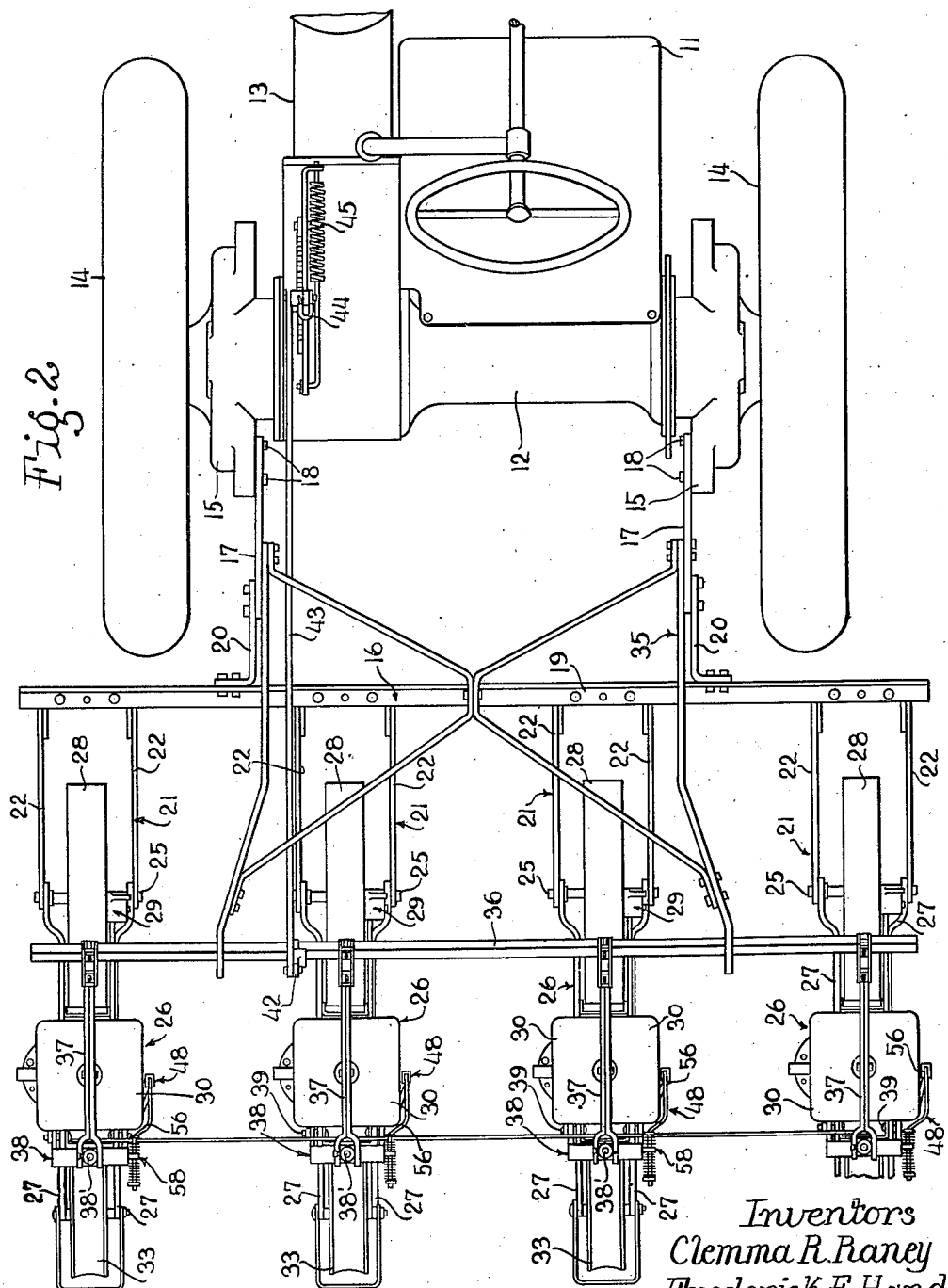

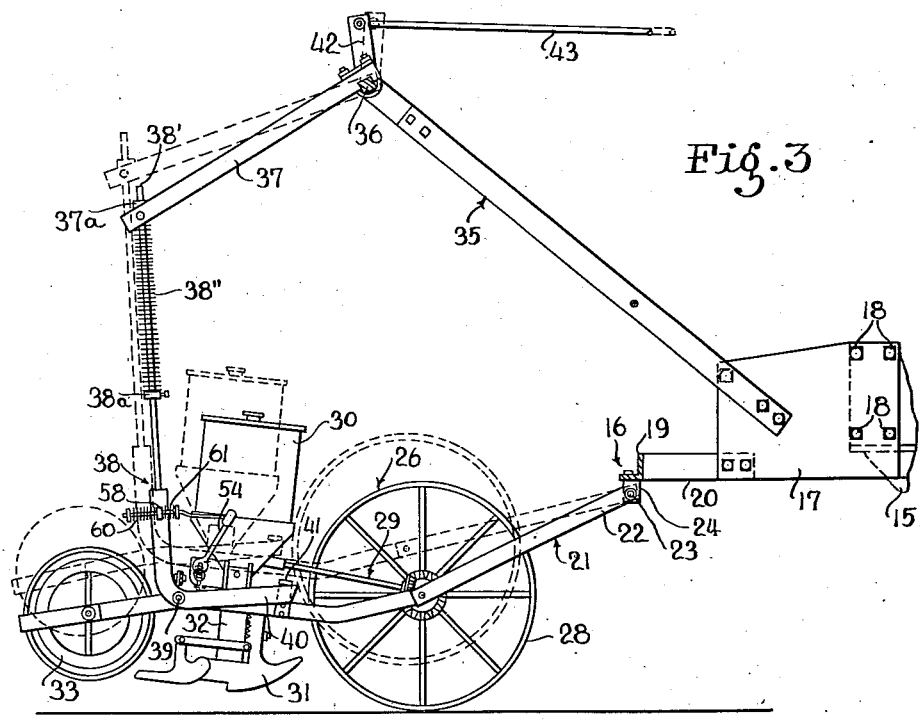
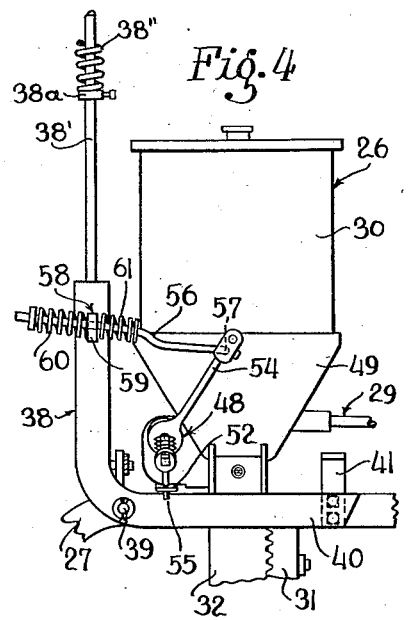
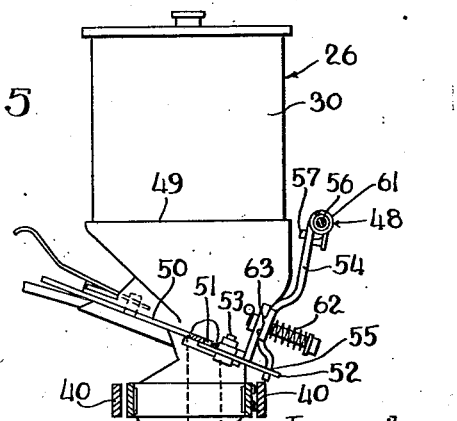

Patented Jan. 13, 1942

2,269,987

UNITED STATES PATENT OFFICE 2,269,987

AGRICULTURAL IMPLEMENT

Clemma R. Raney, Riverside, and Frederick E. Hand, Canton, Ill., assignors to International Harvester Company, a corporation of New Jersey Application October 9, 1940, Serial No. 360,434

6 Claims. (Cl. 111—59)

The invention relates to agricultural implements and more particularly to lifting mechanism for the lifting of implements into their transport position.

It is an object of this invention to provide an arrangement for the lifting of implement frames or the like connected to a supporting frame for vertical movement with respect thereto whereby these lifting frames may be maintained substantially level during the lifting operation.

It is another object of the invention to provide in a planter frame an arrangement having a seed dispenser associated therewith and a control valve for regulating the flow of seed from the dispenser which will be automatically operated by the operation of the lifting mechanism itself as the same is put into the position to lift the planter frame to its transport position.

According to the present invention there has been provided an attachment adapted to be connected to the rear of the tractor, a lifting mechanism so shaped and arranged and adapted to lock with individual planter frames upon operation of the lifting mechanism which will maintain the individual planter frames forming a part of the attachment in a level position upon the same being raised. These planter frames normally have two supporting wheels for supporting the same in their ground planting position and one of which wheels serves to drive the seed dispenser mechanism by contact with the ground during planting operation. With the lifting mechanism of the present arrangement, these supporting wheels, and particularly the driving wheel, will be positively lifted free of the ground so that the seed dispenser will no longer be operated when the planter frames are in their transport positions. As a means for accomplishing this result, there is provided on each of the individual planter frames a pivotal means havinng a portion extending beyond its point of connection with the planter frame, which is free during the planting operation but which is caused to pivot with respect to the planter frame during the lifting operation to thereby cause engagement of the extending portions with stop means on the frame so that the planter frames are thereby held positively in equilibrium upon being lifted to their transport positions. The portions of the planter frames having particularly the drive wheels thereon will not be permitted to drop since the stop means are in engagement with the longitudinal extending portions of the pivotal means. This pivotal means forms a part of the lifting mechanism and is connected by a lift rod to a lifting arm adapted to be operated by a rock-shaft. This lifting arm is of sufficient length and the rock-shaft is so positioned relative to the planter frames and their associated pivotal means as to automatically effect pivotal movement of the pivotal means during the lifting operation.

The seed dispensing mechanism mounted on each planter frame also includes a valve adapted to control the flow of seed from the seed dispenser. This valve is connected with the pivotal means and due to relative movement between the pivotal means and the planter frame, the valve will be automatically closed as the planter frames are lifted to their transport position.

For other objects and for a better understanding of the invention, reference may be had to the following detailed description taken in connection with the accompanying drawings, in which:

Figure 2 is a plan view of the rear portion of the tractor and showing the planter attachment connected to the rear thereof and extending transversely in rear of the tractor wheels;

Figure 3 is a view similar to Figure 1 of the attachment showing different steps in the lifting of the individual planter frames;

Figure 4 is an enlarged detail view of the pivotal means and the connection of the control valve for the seed dispenser connected to the pivotal means; and, Figure 5 is likewise an enlarged detail view of the valve mechanism for the seed dispenser.

Figure 1:
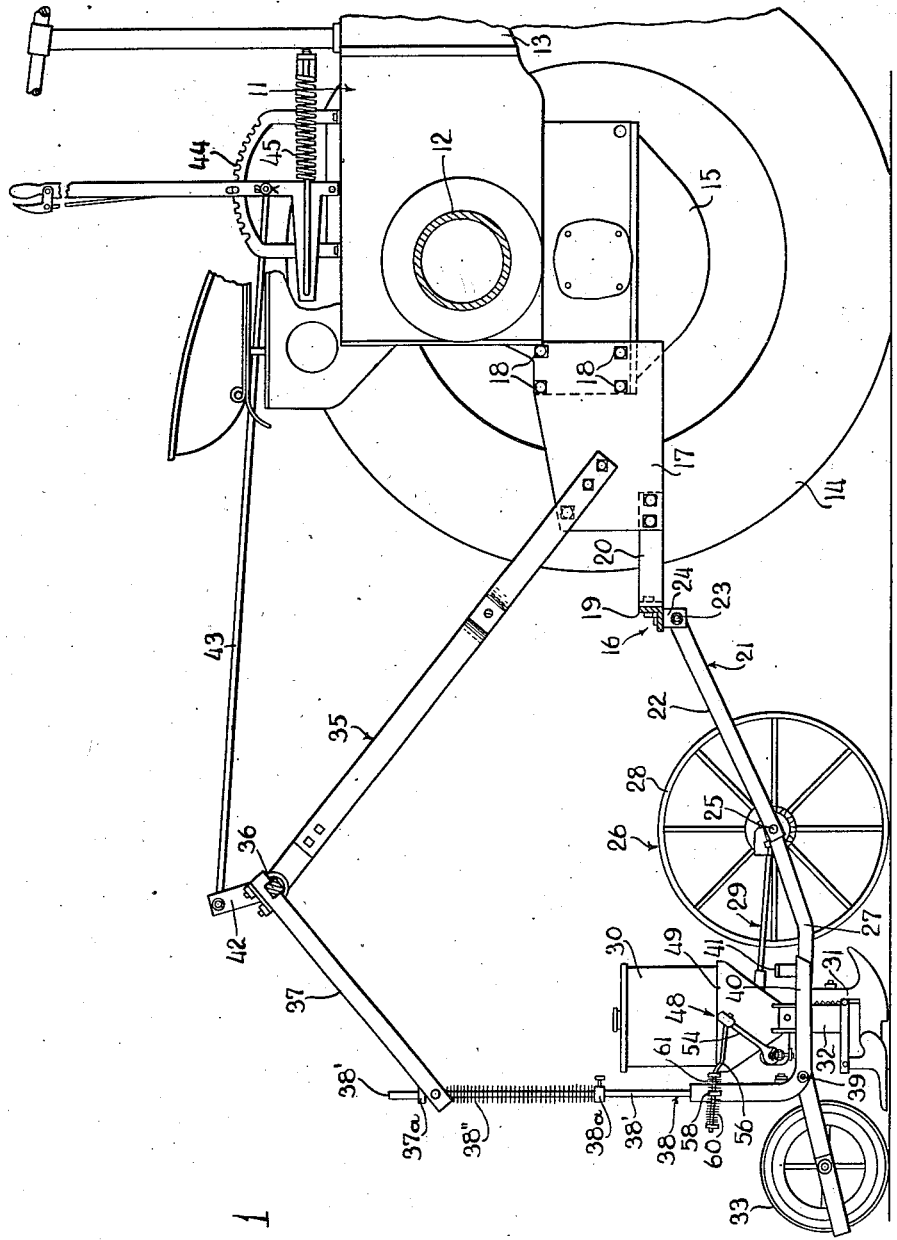
Figure 1 is a side view in elevation of a rear portion of the tractor with the planting attachment including the features of the present invention directly connected thereto.

Referring now particularly to Figures 1 and 2, there is shown a tractor or supporting frame 11 which has a rear axle portion 12 extending transversely with respect to a forwardly extending body portion 13 and through which extend axle structures for connection with the rear traction wheels 14. This rear axle structure includes depending stub axle housings 15 located respectively at opposite sides of the tractor and serving as a means to which implement attachments may be attached.

The implement attachment may include a main frame structure indicated generally at 16 and comprising side plates 17 adapted to be respectively attached by means of attaching bolts 18 to the depending housings 15 of the tractor 11 and a transversely extending tool bar 19 rigidly connected with the plates 17 by means of angle brackets 20 and extending at opposite sides of the tractor beyond the rear wheels.

This transversely extending member 19 serves as a means to which individual drag-link structures 21 are attached in transversely spaced location with respect to the tractor. These drag-link structures 21 include a pair of strap pieces 22 pivoted at 23 to depending brackets 24 fastened to the under face of the transversely extending bar 19. The free ends of these strap pieces 22 are connected to the outer ends of an axle 25 forming a part of the planter frame structure 26. The planter frame structure 26 includes side strap pieces 27 arranged to be parallel with respect to each other and between the forward end of which is pivoted a drive wheel 28 carried by the axle 25. This drive wheel 28 through mechanism 29, well known in the art, serves to drive a seed dispenser 30 supported on the planter frame 26. Located beneath the seed dispenser 30 and rigidly carried by the frame of the planter 26 is a seed furrow opening implement 31 and its associated seed boot 32. Between the rear ends of the straps 27 is located the usual covering wheel 33. It should now be apparent that there has been provided a planter frame which is self-driven and which is connected by a drag-link structure 21 to the transverse tool bar 19 whereby the same may have vertical movement with respect to the attaching frame structure 16 and the tractor 11. There are four or more of these individual planting units located in transversely spaced relation along the tool bar 19 whereby four or more rows may be planted at one time as the tractor and its attachment move along the field.

Connected to the plates 17 and extending rearwardly and upwardly therefrom is a rock-shaft supporting structure 35 having pivoted in its upper end a rock-shaft 36 to which there may be connected lifting arms 37 extending rearwardly therefrom for connection with a pivotal means 38 pivoted at 39 respectively to the planter frame. The lower end of this pivotal means 38 takes the form of a fork arrangement so that portions of the same will be respectively connected to both sides of the planter frame so as to maintain the same in lateral equilibrium during the lifting operation. Extending forwardly from the point of connection of the pivotal means 38 with the planter frames 26, are portions 40 adapted to engage with stop means 41 carried respectively by the side pieces 27 of the planter frame 26. When the planter tools are in their ground-working positions, these extending portions 40 are out of engagement with the stop means 41. The upper end of the pivotal means may include a lift rod 38' to which may be attached a pressure spring 38" adapted to react against a trunnion connection 37a of the rod part 38' with the lifting arm 37 and against an adjusting collar 38a fixed on the rod part 38'.

Connected to the rock-shaft 36 is a single arm 42 from which there extends forwardly a connecting rod 43, the forward end of which is connected to a lever and quadrant mechanism 44. By this arrangement it will be apparent that the rock-shaft and its lifting arms 37 may be rocked so that lifting can be effected through the pivotal means 38 connected respectively with each of the planter frames 26. A spring means 45 is connected to the lever and quadrant arrangement to assist in the lifting operation of the planter frames.

Referring now more particularly to Figure 3, it will be noted that the rock-shaft is so arranged and that the lifting arms 37 are of sufficient length with respect thereto that as the rock-shaft and the lifting arms are rocked by the lever and quadrant means 44, the upper end of the pivotal means is thrown rearwardly as illustrated in dotted lines to thereby effect rearward pivotal movement of the pivotal means 38 about its pivotal connection 39 with the planter frames 26. By so pivoting the pivotal means in a rearward direction the forwardly extending portions 40 will engage with the stop means 41 thereby insuring positive picking up of the forward portion of the planter frame and the drive wheel 28. Without such an arrangement the drive wheel would probably remain in contact with the ground and planting and driving of the seed dispenser would normally continue regardless of whether the planter frames were in their planting positions. With the forwardly extending portions the planter frames are lifted as though they were lifted from two locations, though lifting is effected only by a single lifting means. It should thus be apparent that by such an arrangement necessity of having an arrangement of additional lifting means to insure the planter frames being lifted is unnecessary. Use is thereby made of the lifting means to effect steadying of the planter frames during the lifting operation, and the frames will be maintained substantially horizontal upon being lifted.

Referring now particularly to Figures 4 and 5, it will be noted that the seed dispenser has a valve control means indicated generally at 48. The seed dispensers 30 include a base portion 49 which has fitted within the same a seed plate 50 having a seed opening 51. The valve mechanism 48 may include a covering valve plate 52 arranged underneath the opening 51 and pivoted about a pivot bolt 53 by means of an actuating arm 54, the lower end of which extends through the plate 52 at 55. A movement of the arm 54 thereby causes swinging of the plate 52 either into or out of registry with the opening 51. As viewed in Figure 4, the arrangement is such that when the arm 54 is moved to the left, closing of the opening 51 will be effected.

Since there is angular movement of the pivotal means with respect to the planter frame 26, advantage may be taken of this movement whereby the valve mechanism may be automatically operated upon the lifting of the planter frame and the flow of seed will be automatically cut off. Connection is therefore made by means of a link 56 connected at the upper end of the lever 54 at 57 and to the forked part of the pivotal means at 58. This connection at 58 includes a transversely extending flange 59 having an opening through which the connection rod 56 projects. Springs 60 and 61 are located respectively on opposite sides of the flange 59 and made fixed at their outer portions to the connecting rod 56. By the use of these springs, any slight variation of movement of the pivotal means when the planting unit is in its planting position, will not effect decided movement upon the valve plate 52 so that the same might accidentally close the opening 51 during the planting operation, the valve being held in either position by spring press means 62 acting to hold projecting portion 63 on arm 54 in appropriate notches formed in the seed dispenser base 49. It should now be apparent that use has also been made of the lifting means to effect automatic closing of the seed dispenser valve during the lifting operation.

The making use of the lifting means to serve this purpose of closing the valve and as well to effect lifting of the planter frame makes for simplicity of construction and otherwise needed parts used in other constructions have been eliminated.

While various changes may be made in the detail construction of the present invention, it shall be understood that such changes shall be within the spirit and scope of the invention as defined in the appended claims.

What is claimed is:

1. In combination, a supporting frame, a substantially horizontally extending tool-carrying frame, means for connecting said tool-carrying frame to the supporting frame for vertical movement, means for lifting the tool-carrying frame including lifting connection means pivotally connected to the tool-carrying frame for pivotable movement and having a portion extending beyond its pivotal connection with the frame and adapted to lock with the frame upon pivotal movement in one direction with respect to the same, and a lifting arm so connected to the connection means and arranged as to effect the pivotal movement of the same during the lifting of the frame whereby all portions of the tool-carring frame will be maintained substantially horizontal throughout the lifting of the same.

2. In combination, a supporting frame, a drag-link pivotally connected to the frame, a substantially horizontally extending tool-carrying frame pivotally connected to the drag-link, pivotable means on the tool-carrying frame having a portion adapted to extend beyond its pivotal connection with the frame, said tool-carrying frame having stop means adapted to be engaged by the extending portion as the pivotable means is pivoted with respect to the tool-carrying frame, and means for lifting the tool-carrying frame connected to the pivotable means and including means for causing pivotal movement of the pivotable means so as to have its portion engage with the stop means of the tool-carrying frame during the lifting movement, whereby all portions of the tool-carrying frame will be maintained substantially horizontal throughout the lifting of the same.

3. In combination, a tractor, a drag-link pivotally connected to the frame, a substantially horizontally extending frame pivotally connected to the drag-link, planting means carried by the horizontally extending frame and including a tool adapted to work the ground, wheel supporting means for the frame, pivotable means on the horizontally extending frame having a portion adapted to extend beyond its pivotal connection with the frame, said frame having means adapted to be engaged by the extending portion of the pivotable means as it is pivoted with respect to pivotable means, and means for lifting the frame and the frame, and means for lifting the frame and its associated planting means including means for causing pivotal movement of the pivotable means so as to have its portion engage with the stop means of the frame upon the lifting of the same whereby the frame and its associated planting means and wheel supporting means will be maintained substantially horizontal upon being lifted.

4. In combination, a tractor, a ground planter attachment adapted for connection to the tractor and including a draft structure extending transversely with respect to the tractor, a plurality of drag-links pivotally connected to the draft structure at intervals transversely spaced therealong, individual planter frames pivotally connected, respectively, to the drag-links and means for supporting each of the same in their planting positions, including wheels spaced longitudinally all along the frame, rockable means on each of the respective planter frames adapted to be rocked fore and aft with respect thereto and having a portion adapted to extend beyond its connection with the frame, each of said frames having stop means adapted to be engaged by the extending portion of the respective rockable means when rocked in one direction, a lifting rock-shaft and means for supporting the same about the planter frames, connection means between the rock-shaft and the respective rockable means including lifting arms of sufficient length and so arranged as to effect rockable movement of the rockable means driving the lifting of the frames thereby causing engagement of the extending portions with their respective stop means, whereby upon lifting of the frames both of the supporting wheels for the respective frames will be lifted free of contact with the ground.

5. In combination, a supporting frame, a planter frame connected to the supporting frame for vertical movement with respect thereto, a seed dispenser carried by the planter frame and having a seed valve to control the flow of the seed therefrom, lifting means for lifting the planter frame including lifting connections adapted to have movement relative to the planter frame during the lifting operation, and means connecting the seed valve with the lifting connections whereby upon the lifting of the planter frame the flow of seed will be cut off.

6. In combination, a tractor, a planter frame connected to the tractor for vertical movement with respect thereto, a seed dispenser carried by the planter frame and having a seed valve to control the flow of seed therefrom, pivotal means on the planter frame, a lifting arm connected with the pivotable means to lift the planter frame thereby, said lifting arm being so shaped and arranged with respect to the pivotable means as to effect pivotal movement with respect to the planter frame during the lifting operation, means connecting the valve with the pivotable means with the seed valve whereby upon the lifting of the planter the flow of seed will be cut off.

CLEMMA R. RANEY.
FREDERICK E. HAND.